United States Patent
Granström et al.

(10) Patent No.: US 9,816,448 B2
(45) Date of Patent: Nov. 14, 2017

(54) METHOD AND SYSTEM FOR CONTROLLING A TURBOCHARGED ENGINE DURING AN UPSHIFT

(71) Applicant: SCANIA CV AB, Södertälje (SE)

(72) Inventors: Magnus Granström, Hägersten (SE); Anders Larsson, Tullinge (SE)

(73) Assignee: SCANIA CV AB (SE)

( * ) Notice: Subject to any disclaimer, the term of this patent is extended or adjusted under 35 U.S.C. 154(b) by 33 days.

(21) Appl. No.: 14/787,066

(22) PCT Filed: Apr. 29, 2014

(86) PCT No.: PCT/SE2014/050523
§ 371 (c)(1),
(2) Date: Oct. 26, 2015

(87) PCT Pub. No.: WO2014/178785
PCT Pub. Date: Nov. 6, 2014

(65) Prior Publication Data
US 2016/0138495 A1 May 19, 2016

(30) Foreign Application Priority Data
Apr. 30, 2013 (SE) .................................. 1350531

(51) Int. Cl.
*F02D 41/00* (2006.01)
*F02B 37/24* (2006.01)
(Continued)

(52) U.S. Cl.
CPC .......... *F02D 41/0007* (2013.01); *F02B 33/40* (2013.01); *F02B 37/22* (2013.01);
(Continued)

(58) Field of Classification Search
CPC ............. F02D 41/0007; F02D 41/2406; F02D 41/023; F02D 41/26; F16H 61/0403; F02B 33/40; F02B 37/22; F02B 37/24
See application file for complete search history.

(56) References Cited

U.S. PATENT DOCUMENTS 4,680,988 A * 7/1987 Mori ..................... B60W 10/06
477/102
5,778,329 A * 7/1998 Officer .................... F16H 59/14
123/564

(Continued)

FOREIGN PATENT DOCUMENTS

DE   197 12 850 A1   10/1998
DE   102004048826 A1   4/2006
(Continued)

OTHER PUBLICATIONS

International Search Report dated Aug. 29, 2014 issued in corresponding International patent application No. PCT/SE2014/050523.

*Primary Examiner* — Hieu T Vo
*Assistant Examiner* — Sherman Manley
(74) *Attorney, Agent, or Firm* — Ostrolenk Faber LLP

(57) ABSTRACT

A method for propulsion of a vehicle (100): The vehicle (100) includes a combustion engine (101), and a gearbox (103) that can be adjusted to a number of gear ratios for transfer of force between the combustion engine (101) and at least one driving wheel (113, 114), at least one combustion chamber with at least one inlet for the supply of combustion gas and at least one outlet for the evacuation of an exhaust gas flow that has resulted from combustion in the combustion chambers and a turbocharger unit (203) for pressurizing the combustion gas. In the method, during the change of gear from a first higher gear ratio to a second lower gear ratio, the rate of revolution of the combustion engine (101) is reduced, to control the turbocharger unit such that the pressure of the (Continued)

combustion gas is reduced, to increase the pressure at the outlet by constriction of the exhaust gas flow, and when the rate of revolution of the combustion engine (101) has at least partially fallen towards a second rate of revolution, to control the turbocharger unit such that the combustion gas pressure is increased. Also a system and a vehicle including the system.

22 Claims, 5 Drawing Sheets

(51) Int. Cl.
| | | |
|---|---|---|
| *F02D 9/06* | (2006.01) | |
| *F16H 63/50* | (2006.01) | |
| *F02B 37/22* | (2006.01) | |
| *F02B 33/40* | (2006.01) | |
| *F02D 41/02* | (2006.01) | |
| *F02D 41/24* | (2006.01) | |
| *F02D 41/26* | (2006.01) | |
| *F16H 61/04* | (2006.01) | |

(52) U.S. Cl.
CPC ............... *F02B 37/24* (2013.01); *F02D 9/06* (2013.01); *F02D 41/023* (2013.01); *F02D 41/2406* (2013.01); *F02D 41/26* (2013.01); *F16H 61/0403* (2013.01); *F16H 63/50* (2013.01); *F01N 2240/36* (2013.01); *F01N 2340/06* (2013.01); *F02D 2200/101* (2013.01); *Y02T 10/144* (2013.01)

(56) References Cited

U.S. PATENT DOCUMENTS

| | | | | |
|---|---|---|---|---|
| 5,921,883 | A * | 7/1999 | Bellinger | B60W 30/18 123/322 |
| 6,233,934 | B1 * | 5/2001 | Church | F02B 37/24 60/602 |
| 6,325,743 | B1 * | 12/2001 | Genise | B60W 10/06 477/124 |
| 6,349,253 | B1 * | 2/2002 | Bellinger | B60W 10/06 477/115 |
| 6,409,629 | B1 * | 6/2002 | Davis | F16H 61/16 477/124 |
| 6,461,273 | B1 * | 10/2002 | Davis | F16H 3/12 477/124 |
| 6,543,226 | B1 * | 4/2003 | Bischoff | F02D 9/06 60/602 |
| 6,663,535 | B2 * | 12/2003 | Holloway | F02D 41/0225 477/110 |
| 6,692,406 | B2 * | 2/2004 | Beaty | B60W 10/06 477/109 |
| 6,855,090 | B2 * | 2/2005 | Tabata | B60W 10/06 477/107 |
| 7,048,671 | B2 * | 5/2006 | Morisawa | B60W 10/02 477/109 |
| 7,214,163 | B2 * | 5/2007 | Jeon | B60W 30/18 477/109 |
| 2007/0111853 | A1 | 5/2007 | King et al. | |

FOREIGN PATENT DOCUMENTS

| | | |
|---|---|---|
| EP | 2 366 879 A2 | 9/2011 |
| WO | WO 2012/121657 A1 | 9/2012 |

* cited by examiner

METHOD AND SYSTEM FOR CONTROLLING A TURBOCHARGED ENGINE DURING AN UPSHIFT

CROSS-REFERENCE TO RELATED APPLICATIONS

The present application is a 35 U.S.C. §§371 national phase conversion of PCT/SE2014/050523, filed Apr. 29, 2014, which claims priority of Swedish Patent Application No. 1350531-8, filed Apr. 30, 2013, the contents of which are incorporated by reference herein. The PCT International Application was published in the English language.

TECHNICAL FIELD

The present invention relates to the propulsion of vehicles, and in particular to a method performed during the changing of gears. The invention concerns also a system and a vehicle, and also a computer program and a computer program product, that implement the method according to the invention.

BACKGROUND TO THE INVENTION

The background description below constitutes background description for the invention and thus does not necessarily describe prior art technology.

A number of different propulsion chain configurations are used with respect to vehicles in general. A gearbox, for example, may be constituted by a manually changed gearbox or an automatically changed gearbox. With respect to heavy vehicles, it is often desirable that they should be propelled in a manner that is as comfortable as possible for the driver. That normally means that changes of gear in the gearbox should be carried out automatically, with the aid of control systems of the vehicle. The use of automatic gearboxes in heavy vehicles has, therefore, become common.

Automatic gear changing for heavy vehicles often constitutes a change of gear of "manual" gearboxes in which the change operation is controlled by a control system. Such gearboxes thus include one pair of cogged wheels for each gear, wherein the gear ratios are distributed at appropriate intervals. This type of gearbox has the advantage that the gearboxes often demonstrate a higher efficiency than conventional automatic gearboxes. A clutch is used with such gearboxes. The clutch may be constituted by a clutch that is controlled automatically by the control systems of the vehicle, in order to couple the engine of the vehicle to the gearbox.

In principle, the clutch in such vehicles needs to be used only during start of the vehicle from stationary, since other gear changing can be carried out by the control systems of the vehicle without the clutch being opened. In the cases in which the clutch is constituted by an automatic clutch controlled by the control systems of the vehicle, however, the clutch is often used to open and close the propulsion chain also during change of gear.

Independently of whether the clutch is used during change of gear or not, in order to obtain as comfortable a change of gear as possible, it is required that the driving force in the propulsion chain during the change of gear, and thus also the associated interruption in driving force during change of gear, are controlled in such a manner that undesired jerking motion does not occur, while at the same time it is often desirable that the change of gear can be carried out with a relatively short interruption in driving force.

SUMMARY OF THE INVENTION

It is one purpose of the present invention to provide a method for the propulsion of a vehicle in which regulation of the rate of revolution of the combustion engine during change of gear is carried out to make possible both rapid and predictive regulation.

The present invention relates specifically to a method for the propulsion of a vehicle, wherein the vehicle comprises a combustion engine and a gearbox that can be adjusted to a number of gear ratios for the transfer of a force between the said combustion engine and at least one driving wheel. The combustion engine comprises at least one combustion chamber with at least one inlet for a supply of combustion gas and at least one outlet for the evacuation of an exhaust gas flow that has resulted from combustion in the combustion chamber. The engine further comprises a turbocharger unit for ressurisation of the said combustion gas.

During the change of gear from a first higher gear ratio to a second lower gear ratio, where the rate of revolution of the combustion engine is reduced from a first rate of revolution to a second rate of revolution, the method comprises:

controlling the turbocharger unit such that the pressure of the combustion gas is reduced, increasing the pressure at the outlet by constriction of the exhaust gas flow, and when the rate of revolution of the combustion engine has at least partially fallen towards the said second rate of revolution, controlling the turbocharger unit such that the combustion gas pressure is increased.

As has been mentioned above, gearboxes of the type normally used in manually geared vehicles are often used for heavy vehicles, wherein the change of gear is carried out automatically by control systems of the vehicle. Change of gear from one gear ratio to a second with this type of gearbox comprises by its nature the interruption of the propulsion chain when the currently engaged gear is disengaged, and its subsequent reconnection when a new gear has been engaged.

The rate of revolution of the combustion engine must, however, be synchronised with the expected rate of revolution of the input shaft of the gearbox with the new gear engaged, before the propulsion chain is reconnected, such that undesired jerking or oscillations do not arise during the change of gear. During this change, synchronisation of the rate of revolution of the combustion engine can be carried out in several ways.

For gearing down, it can be performed by accelerating the combustion engine with the aid of supply of fuel, while the opposite can be performed for gearing up to a higher gear, i.e. change of gear to a lower gear ratio, in that the combustion engine is braked to the lower rate of revolution of the input shaft to the gearbox at the new (higher) gear. A clutch, for example, can be used during the change of gear, whereby the clutch can be used for synchronisation of the rate of revolution of the combustion engine. However, this is preferably performed with a slipping clutch in order to avoid jerking and oscillations in the propulsion chain. It may, however, be desirable to perform the change of gear without slipping the clutch, for example, to reduce wear. It may be desirable also to perform the change of gear without use of the clutch at all, i.e. to use a process in which the then prevailing gear is disengaged, after which the rate of revolution of the combustion engine is synchronised before a new gear is engaged, and in combination with a suitable relief of torque, to also change the gear without the use of the clutch and without jerking. Furthermore, it is often desirable to carry out the change of gear as rapidly as possible, while at the same time retaining the ease of driving and the comfort of the vehicle.

It may, therefore, be desirable to brake the combustion engine by another method than with the aid of the clutch. The present invention provides a method to brake the combustion engine during gearing up that makes possible an efficient braking of the combustion engine to a desired rate of revolution, and which in turn makes possible a change of gear with a relatively short interruption in driving force. The invention has, the further advantage that a large driving force becomes rapidly available if required after the change of gear.

Braking of the combustion engine is achieved according to the invention not only through controlling the turbocharger unit such that the pressure of the exhaust gas supplied to the combustion process is reduced, but also through the pressure at the combustion chamber outlet being at the same time increased through constriction of the exhaust gas flow. A high differential pressure across the combustion engine is achieved, whereby a corresponding relatively large braking force is obtained with which the rate of revolution of the combustion engine can be reduced, whereby the rate of revolution of the combustion engine can be efficiently reduced to the desired rate. Furthermore, an increase in pressure of the combustion gas is started before the new gear has been engaged and the propulsion chain has again been connected, i.e. an increase in pressure is achieved with the aid of the turbocharger unit, whereby combustion gas under pressure is available immediately after the propulsion chain has been connected after the change of gear such that a higher driving force can be made available. According to one preferred embodiment, an increase in pressure of the combustion gas is started before the rate of revolution of the combustion engine has fallen to the second rate of revolution.

The method according to the present invention can be implemented with the aid of, for example, at least one of: one or several processors, one or several FPGA (field-programmable gate array) circuits, and one or several ASICs (application-specific integrated circuit).

Further characteristics of the present invention and its advantages will be made clear by the following detailed description of embodiments given as examples, and the attached drawings.

DETAILED DESCRIPTION OF EMBODIMENTS

Figure 1A:
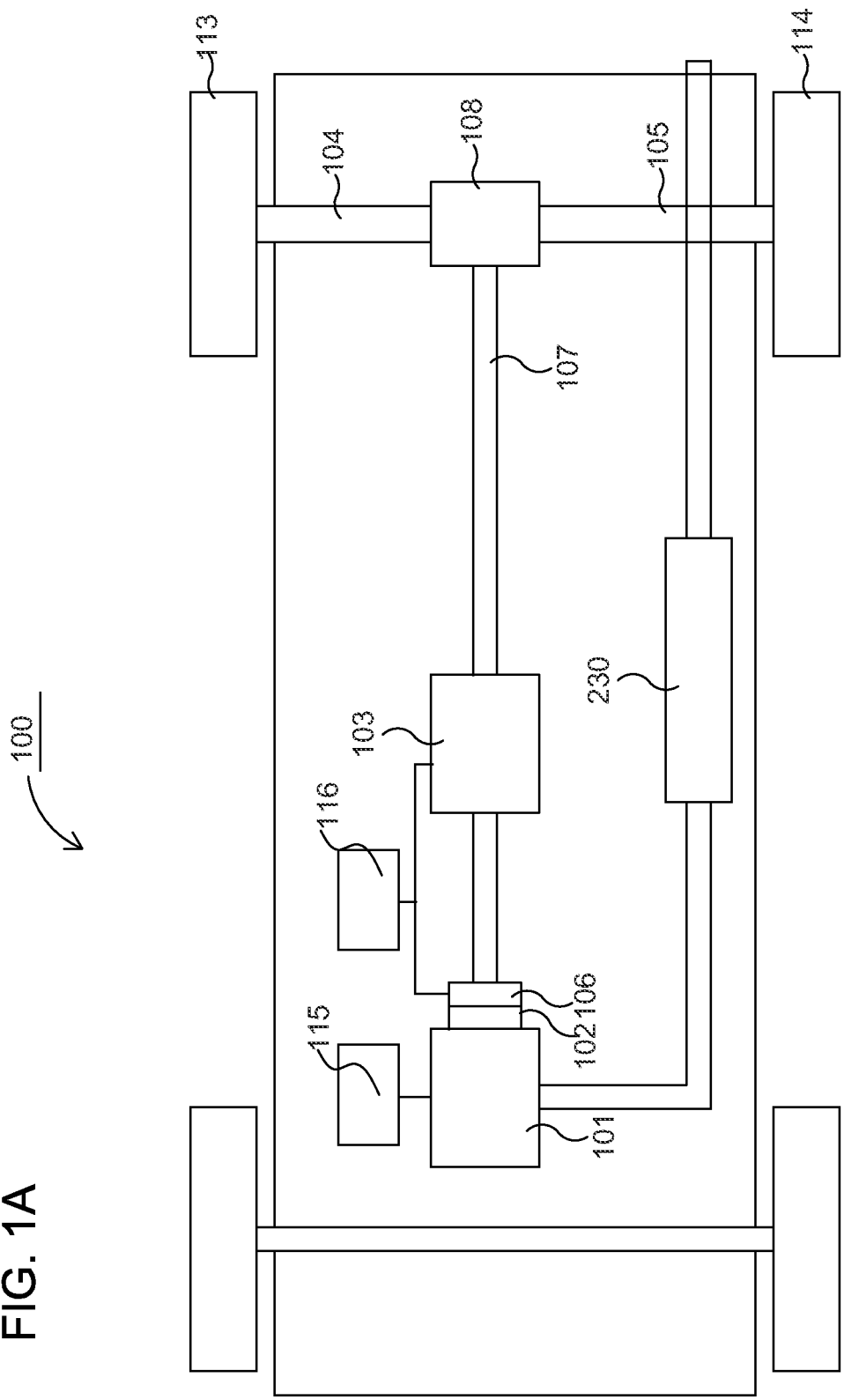
FIG. 1A shows schematically a vehicle on which the present invention can be used.

FIG. 1A shows schematically a propulsion chain in a vehicle 100 according to one embodiment of the present invention. The vehicle shown schematically in FIG. 1A comprises only one axle with driving wheels 113, 114. But, the invention can be applied also to vehicles in which more than one axle is provided with driving wheels, and also to vehicles with one or several further axles, such as one or several support axles. The propulsion chain comprises a combustion engine 101, which is connected to a gearbox 103 through a clutch 106 in a conventional manner, through an output shaft at the combustion engine 101, normally through a flywheel 102.

The combustion engine 101 is controlled by the control systems of the vehicle through a control unit 115. In the same manner the clutch 106, which may constitute, for example, an automatically controlled clutch, and the gearbox 103 are controlled by the control systems of the vehicle 100 with the aid of one or several suitable control units like control unit 116 in FIG. 1A. The propulsion chain of the vehicle 100 may, of course, be of another type.

An output shaft 107 from the gearbox 103 drives the driving wheels 113, 114 through a final gear 108 such as a conventional differential gear, and drive shafts 104, 105 connected to the final gear 108. The present invention is applicable also for hybrid vehicles, where, in addition to a combustion engine, one or several further sources of power, such as one or several electric motors, can be used for propulsion of the vehicle.

The vehicle 100 comprises further an exhaust gas system with a post-processing system 230 for the processing (cleaning) of exhaust emissions that result from combustion in the combustion chamber of the combustion engine 101.

Figure 2:
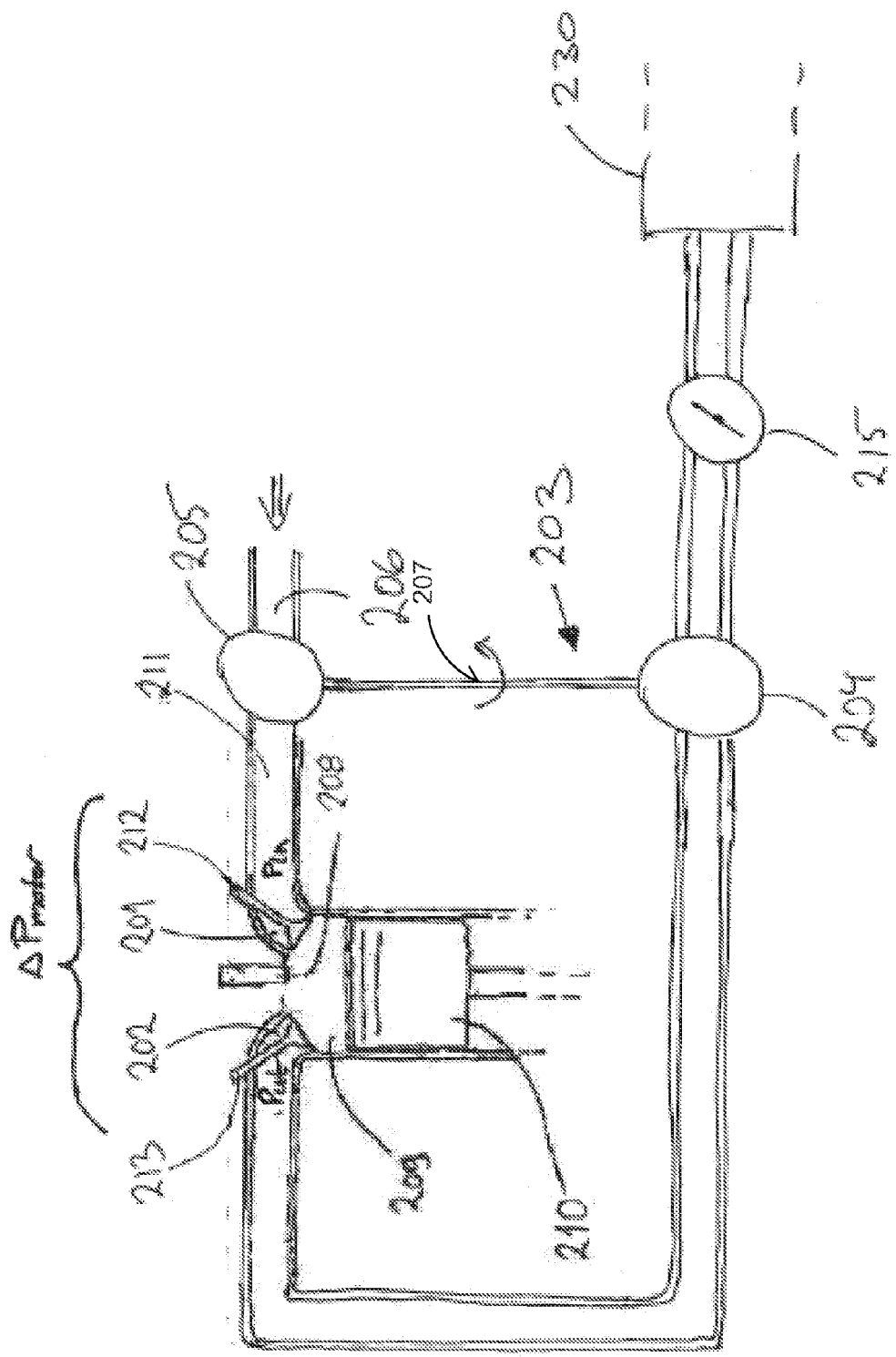
FIG. 2 shows schematically in more detail the post-treatment system for the vehicle shown in FIG. 1A.

FIG. 2 schematically shows the combustion engine 101 in somewhat greater detail. Although that drawing shows only one cylinder/combustion chamber 209 for the combustion engine 101, with a piston 210 that operates within the cylinder, the combustion engine 101 in the present example is a six-cylinder combustion engine. It may generally comprise an engine with a freely chosen number of cylinders/combustion chambers, for example, in the range of 1-20, or even more. Combustion engines of this type generally also comprise also at least one fuel injector 208 for each combustion chamber (cylinder) 209, and fuel injectors supply fuel in a conventional manner to the combustion chamber 209 for the combustion.

Furthermore, each combustion chamber 209 comprises an inlet 201 for the supply of combustion gas, which is generally constituted at least partially by air, to the combustion process, through an inlet suction line 211, and an outlet 202 for evacuation of exhaust gas flow that results from the combustion. The supply of combustion gas and the evacuation of the combustion chamber may be controlled in conventional manner by, for example, valves 212, 213.

The exhaust gases (the exhaust gas flow) generated during the combustion are subsequently led through a turbocharger unit 203 and an exhaust gas brake system 215 to the post-processing system 230 for post-processing (cleaning) of the exhaust gas flow before the exhaust gases are released into the surroundings of the vehicle 100. The post-processing system 230 may comprise in conventional manner, for example, at least one of diesel particle filters, oxidation catalysers and SCR catalysers. The post-processing system may comprise also several other types of component, as is well-known to one skilled in the arts. The post-processing system is therefore not described in detail here.

Use of the turbocharger unit according to FIG. 2 furthermore causes the combustion engine 101 to become supercharged, i.e. the pressure of the combustion air supplied to the combustion chambers exceeds the pressure that surrounds the vehicle 100.

This supercharging is achieved in the present example with the aid of the turbocharger unit 203, which comprises a turbine 204 and a compressor 205 that is driven by the turbine 204 through a shaft 207. The compressor 205 compresses, i.e. places under pressure, air that is supplied through an inlet 206, such as air from the surroundings of the vehicle 100, possibly also together with conventional recirculation of exhaust gases, known as EGR (not shown in the drawings), for supply to the inlet suction line 211. The ability of the compressor 205 to compress incoming air is controlled by the force or speed at which the turbine 204 rotates. The turbine 204 is, in turn, driven by exhaust gas, which means that its force or speed of rotation is controlled by the passing exhaust gas flow.

The turbocharger unit 203 shown is of a type with variable geometry, which means that the fraction of the exhaust gas flow that is actually used to drive the turbine can be regulated. That can be achieved, for example, through the turbine in known manner being provided with several adjustable guide rails for the regulation of the amount of exhaust gases that is used to influence the turbine wheel, and the amount of exhaust gases that is allowed to pass the turbocharger unit without their energy being exploited for compression of the combustion air. Thus, the operation of the turbine 204 can be regulated with the aid of the adjustable guide rails, whereby the pressure to which the compressor 205 compresses the air that is supplied to the combustion process can also be regulated with the aid of the guide rails.

Figure 3:
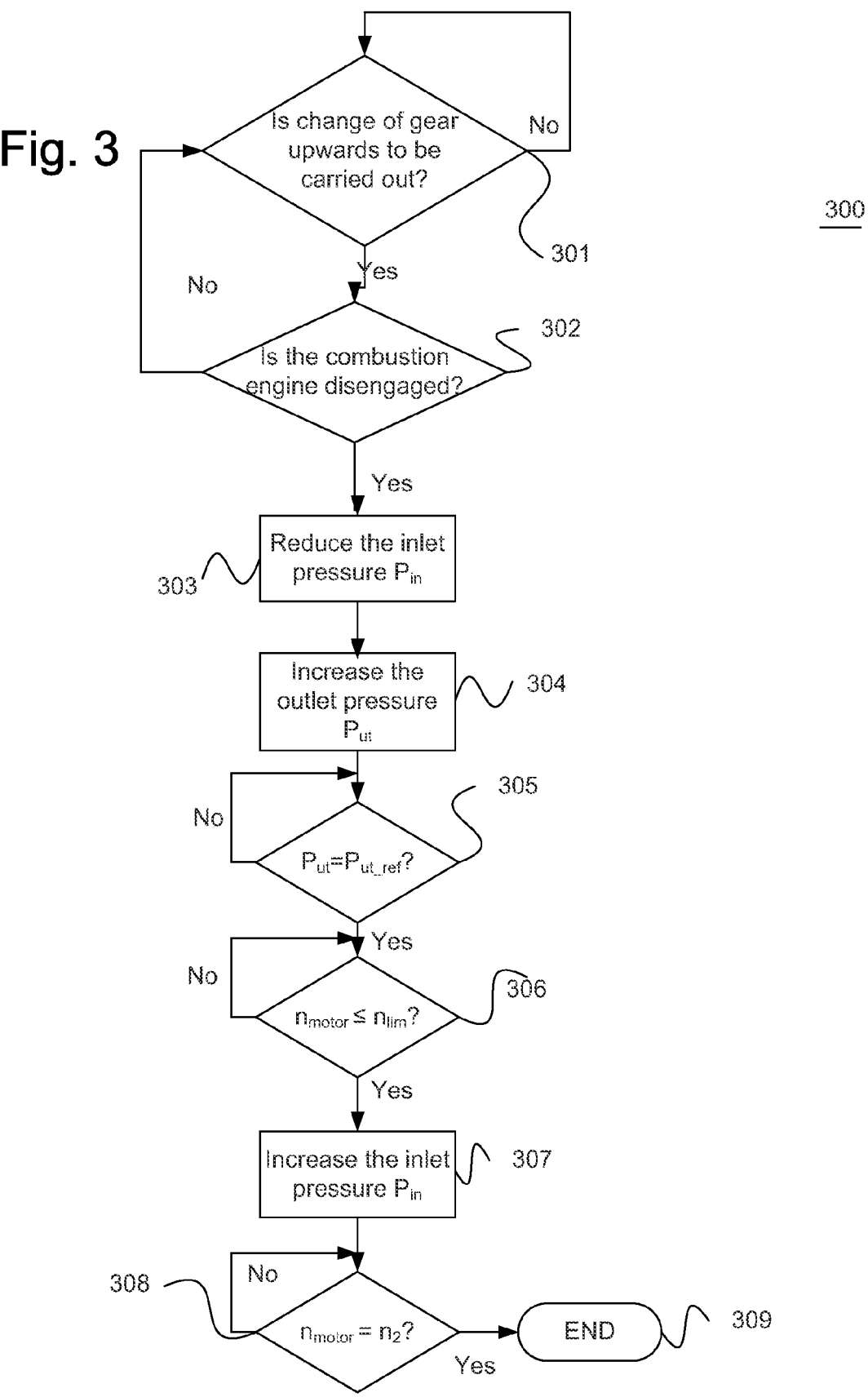
FIG. 3 shows an example method according to the present invention.

The operation of the turbocharger unit 203 is used, according to the present invention, during the control of the change of gear in which change of gear takes place from a lower gear to a higher gear (i.e. from a higher gear ratio to a lower gear ratio). As has been mentioned above, it is generally true that the rate of revolution of a combustion engine changes during change of gear, where change of gear from a lower gear to a higher gear leads to the rate of revolution of the combustion engine becoming lower by a rate of revolution that corresponds to the change in gear ratio (and possibly also change of speed of the vehicle during the change of gear). During change of gear to a higher gear during propulsion of the vehicle, it is often desirable that the change of gear can be carried out in a short period, for example, in order to avoid interruption in the supply of driving force. The present invention concerns a method to brake the rate of revolution of the combustion engine in an efficient manner from the rate of revolution of the previous gear to the rate of revolution of the new gear, during change of gear to a higher gear. An example method 300 according to the present invention is shown in FIG. 3, where the method 300 according to the present example is arranged to be carried out by the engine control unit 115 shown in FIGS. 1A and 1B.

Figure 1B:
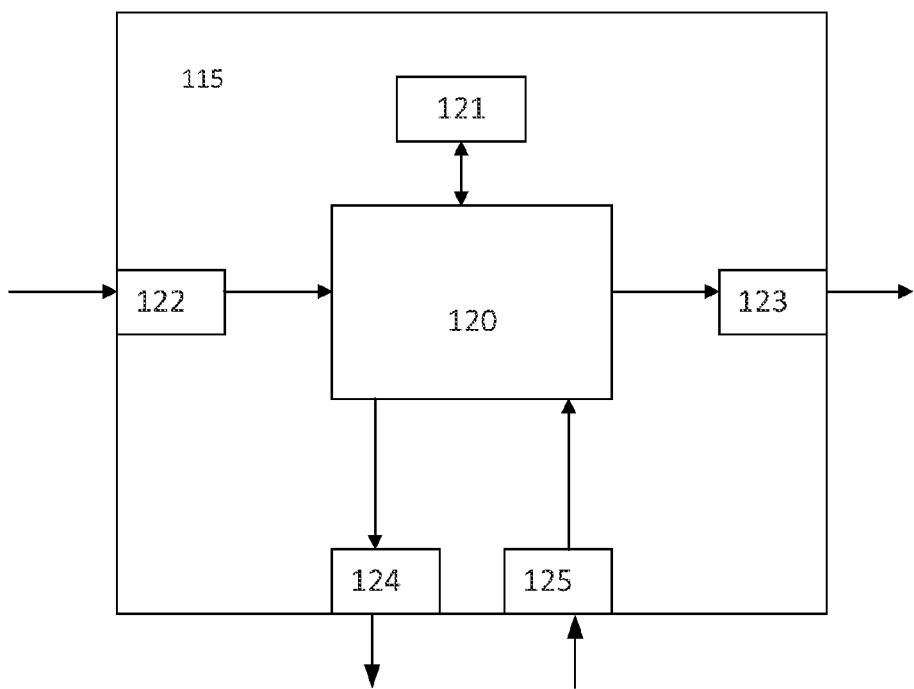
FIG. 1B shows a control unit in the control system for the vehicle shown in FIG. 1A.

Control systems in modern vehicles generally consist of a communication bus system that consists of one or several communication buses in order to connect a number electronic control units (ECUs) such as the control units, or controllers, 115, 116, and various components arranged at the vehicle. Such a control system may comprise a large number of control units, and the responsibility for a particular function may be distributed among more than one control unit. Furthermore, the invention may be implemented in a control unit dedicated to the present invention, or fully or partially implemented in one or several other control units that are already present at the vehicle. For simplicity, only the control unit 116 is shown in FIGS. 1A and 1B, in addition to the engine control unit 115.

The operation of the control unit 115 (or of the control unit or units in which the present invention has been implemented) according to the present invention may depend, for example, on signals from, for example, the control unit 116 with respect to, for example, the status of the clutch or gearbox. Signals may also be sent in a similar manner to the control unit 116. The control from the control unit 115 may depend also on sensor signals concerning, for example, the turbocharger unit 203, the guide rails, or the exhaust gas brake system 215 as described below. It is generally the case that control units of the type shown are normally arranged to receive sensor signals from various parts of the vehicle, such as from various control units arranged at the vehicle.

The control is often controlled by programmed instructions. These programmed instructions are typically constituted by a computer program, which, when it is executed in a computer or control unit, ensures that the computer or control unit carries out the desired control, such as the method steps according to the present invention.

The computer program normally constitutes part of a computer program product, where the computer program product comprises a suitable storage medium 121 (see FIG. 1B) with the computer program stored on the storage medium 121. The said digital storage medium 121 may be constituted by, for example, any one of the group: ROM (Read-Only Memory), PROM (Programmable Read-Only Memory), EPROM (Erasable PROM), Flash memory, EEPROM (Electronically Erasable PROM), a hard disc unit, etc., and it may be arranged in or in connection with the control unit, whereby the computer program is executed by the control unit.

Thus, the behavior of the vehicle in a particular situation can be adapted by changing the instructions of the computer program.

An example control unit (the control unit 115) is shown schematically in FIG. 1B, wherein the control unit may in turn comprise a calculation unit 120, which may be constituted by, for example, any appropriate type of processor or microcomputer, for example, a circuit for digital signal processing (a digital signal processor, DSP), or a circuit with a predetermined specific function (an application-specific integrated circuit, ASIC). The calculation unit 120 is connected to a memory unit 121 that supplies the calculation unit 120 with, for example, at least one of the stored program code and the stored data that the calculation unit 120 requires in order to be able to carry out calculations. The calculation unit 120 is arranged also to store the intermediate or final results of calculations in the memory unit 121.

The control unit is further provided with arrangements 122, 123, 124, 125 for the reception and transmission of input and output signals. These input and output signals may contain waveforms, pulses, or other properties that can be detected by the arrangements 122, 125 for the reception of input signals as information to be processed by the calculation unit 120. The arrangements 123, 124 for the transmission of output signals are arranged to convert calculation results from the calculation unit 120 into output signals for transfer to at least one of other parts of the control systems of the vehicle and the component or components for which the signal is intended. Each one of the connections to the arrangements for reception and transmission of input and output signals may be constituted by one or several of a cable; a computer bus, such as a CAN bus (controller area network bus), a MOST bus (media-oriented systems transport), or any other bus configuration; or a wireless connection.

Consider again FIG. 3, which shows an example method 300 according to the present invention. The method starts at step 301, where it is determined whether change of gear upwards is to take place. The method continues to step 302 if this is the case. It is determined in step 302 whether the combustion engine 101 has been disengaged from the driving wheels 113, 114 of the vehicle 100. This may be carried out by, for example, opening the clutch 106 or by placing the gearbox 103 into its neutral condition.

One purpose of the present invention is to reduce the rate of revolution of the combustion engine 101 to a desired rate as rapidly as possible, i.e. to minimise the time it takes for the combustion engine to reach the desired rate of revolution, where this desired rate of revolution is constituted by the synchronisation rate of revolution for the gear that is to be engaged.

Figure 4:
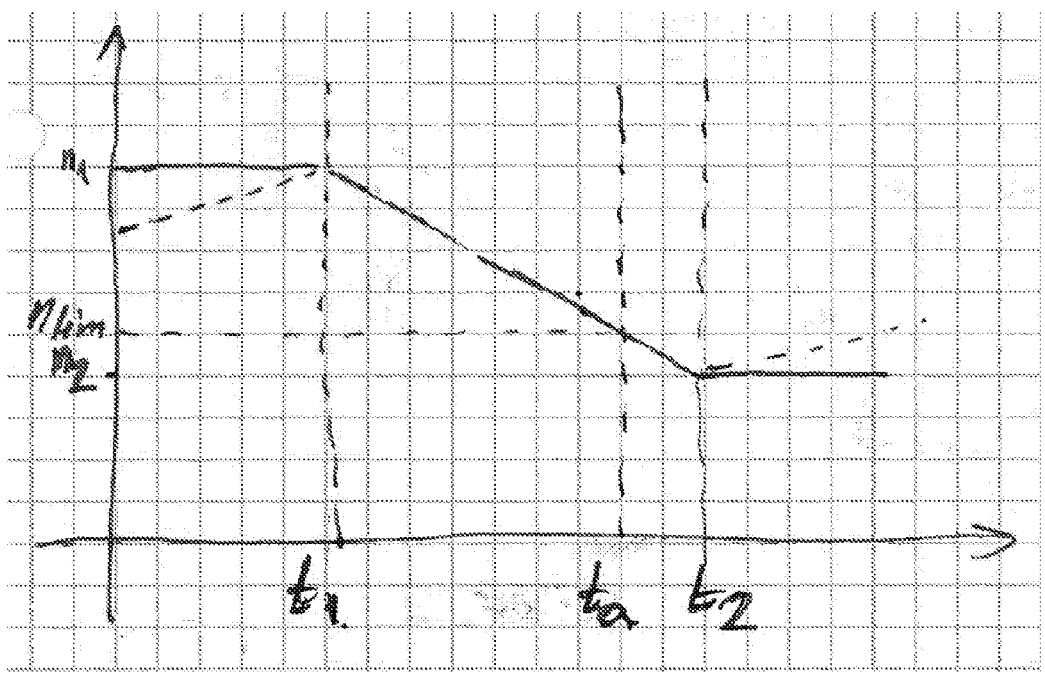
FIG. 4 shows an example of a reduction in rate of revolution according to the present invention.

This is made clear in FIG. 4, where a diagram of the rate of revolution n of the combustion engine as a function of time is shown. The vehicle 100 is driven until time $t_1$ at a speed that results in a rate of revolution $n_1$ of the combustion engine, shown by the continuous line. If the vehicle is undergoing acceleration and is not being driven at a constant speed, the rate of revolution increases before the change of gear, which is indicated by the dashed line in the drawing. Change of gear to a higher gear is initiated at time $t_1$ (or at a suitable time before this), causing the rate of revolution of the combustion engine to be reduced from the rate of revolution $n_1$ to the rate of revolution $n_2$. The more rapidly that the rate of revolution of the combustion engine can be reduced to $n_2$, the more rapidly can the gear be changed. The reduction in the rate of revolution is achieved, according to the present invention, through braking of the combustion engine 101.

According to the present invention, this braking is achieved through an increase in the differential pressure $\Delta P_{motor}$ across the combustion engine, i.e. an increase in the difference in pressure between the inlet pressure $P_{in}$ and the outlet pressure $P_{ut}$ of the combustion chambers 209 (see FIG. 2). The higher that this difference in pressure is made, i.e. the higher that the outlet pressure $P_{ut}$ is relative to the inlet pressure $P_{in}$, the more rapidly will the combustion engine 101 be braked to the desired rate of revolution $n_2$.

The method subsequently continues to step 303, where the combustion pressure is reduced, i.e. the pressure at the inlet 201 to the combustion chambers 209 is reduced. According to the description above, the inlet pressure $P_{in}$ can be regulated by regulating the compressor 205, and for this reason the turbine 204 is controlled in step 303 in such a manner that the combustion air is no longer compressed, or only compressed to a very small degree, and the inlet pressure $P_{in}$ is controlled towards essentially the pressure that surrounds the vehicle 100, or at least a lower pressure than the pressure that is prevalent at time $t_1$. The method subsequently continues to step 304, where the outlet pressure $P_{ut}$ is increased with the aid of a throttle valve arranged in the exhaust gas system of the vehicle. That throttle valve may be, for example, constituted by the exhaust gas brake system 215. The exhaust gas brake system 215 is arranged downstream of the combustion engine 101, and is in the present example arranged also downstream of the turbocharger unit 203. The exhaust gas brake system 215 on request imposes an adjustable constriction of the exhaust gas flow, whereby this constriction gives rise to a back pressure at the outlet of the combustion chambers that will in this way brake the motion of the pistons in the combustion chambers. The higher is this back pressure, the stronger will be the brake effect, and thus the more rapid will be the reduction in the rate of revolution of the combustion engine.

There are normally design limitations on how high a pressure can be allowed upstream of the exhaust gas brake 215, for example, of a magnitude of 4-10 bar. For that reason, the pressure can be monitored in step 305 to determine whether the outlet pressure $P_{ut}$ has reached a reference pressure $P_{ut\_ref}$. As long as this has not occurred, the method remains at step 305 during the ongoing increase of $P_{ut}$. The outlet pressure $P_{ut}$ can be determined with the aid of a suitable pressure sensor arranged upstream of the exhaust gas brake system 215, in a position, for example, at the outlet of the combustion engine 101 or at any other suitable location upstream of the exhaust gas brake system. The outlet pressure may also be determined with the aid of, for example, a cylinder pressure sensor. The outlet pressure may also be arranged to be estimated based on an applicable calculation model, based on, for example, an appropriate pressure measured at another position in the system or based on another measured parameter, through the use of which it is possible to calculate the outlet pressure.

Instead of, or in addition to using the exhaust gas brake, a compression brake (also known as a decompression brake) may be used during constriction of the exhaust gas flow during braking of the combustion engine. When using a compression brake, the braking force during compression in the combustion chambers of the combustion engine can be used. Air is drawn in during compression braking and compressed in a conventional manner. The outlet valves are opened when the pistons reach or approach top dead center in order to reduce the pressure of the combustion chamber, whereby the force generated by the compressed gas is not used during the subsequent expansion. Constriction of the exhaust gas flow, and thus also the increase in the pressure at the outlet, in this case it takes place with the aid of compression in the combustion chamber.

In the description given above, a reduction in pressure of the inlet pressure is carried out first, after which the outlet pressure is increased. The steps 303 and 304 can be arranged also to be carried out in the reverse order or at the same time. In the same way, the closing of the exhaust gas brake system can be started or completed before the combustion engine 101 is disengaged from the driving wheels.

When the desired pressure $P_{ut\_ref}$ that has been determined in step 305, and thus also the desired differential pressure across the combustion engine 101, have been reached, it is determined in step 306 whether the rate of revolution $n_{motor}$ has been reduced to a rate of revolution $n_{lim}$. The rate of revolution $n_{lim}$ is constituted by a rate of revolution that lies below the rate of revolution $n_1$ and lies above the rate of revolution $n_2$. It is preferable that the rate of revolution $n_{lim}$ lie closer to the rate of revolution $n_2$ than the rate of revolution $n_1$. The rate of revolution $n_{lim}$ may be so arranged, for example, that it is constituted by a rate of revolution in which a freely chosen fraction in the interval 50-90% of the total change of rate of revolution $n_1$-$n_2$ that the combustion engine is to undergo has been carried out. This is indicated schematically in FIG. 4 at time $t_a$. Instead of determining in step 306 whether the rate of revolution of the combustion engine 101 has reached a certain rate of revolution $n_{lim}$, it can be determined whether the synchronisation is expected to be completed within a certain time, i.e. when the synchronisation has reached, for example, the time $t_a$ in FIG. 4, where the synchronisation is expected to be completed when a time $t_2$-$t_a$ has passed.

No explicit determination of the rate of revolution of the combustion engine 101 is thus required, according to this embodiment. It may be desirable that the combustion engine 101 is braked with an essentially constant braking power, i.e. an essentially constant differential pressure across the combustion engine, and thus braked by linear braking as is shown in FIG. 4, since it then can be easily estimated when the synchronisation is expected to be completed. In the case in which a non-constant braking force is applied, the endpoint of the synchronisation can be calculated instead with the aid of an applicable model. Since constant braking force is obtained by maintaining a constant differential pressure, it is an advantage if the regulation can be so arranged that it acts during step 306 to maintain a constant $P_{ut}=P_{ut\_ref}$ and also a constant $P_{in}$.

When the rate of revolution of the combustion engine has subsequently reached $n_{lim}$, or the time $t_a$ has been reached, or both the rate of revolution of the combustion engine has reached $n_{lim}$ and the time has reached ta, the method continues to step 307 in order to increase again the pressure $P_{in}$ of the combustion air in order to ensure that the desired driving force is available or can become available rapidly when driving force is again required after the change of gear. This increase of the inlet pressure $P_{in}$ takes place with the aid of the turbocharger unit 203, and in the present example through at least partially reducing the constriction that is applied by the exhaust gas brake 215 such that a differential pressure arises across the turbocharger unit, while at the same time the adjustable guide rails are regulated such that the turbine 204 is caused to rotate at a higher rate of revolution, with the consequence that a corresponding higher rate of revolution of the compressor is obtained, which in turn gives a higher compression of the air that is input by suction.

The inlet pressure $P_{in}$ may be arranged to be controlled towards a suitable inlet pressure, such as an inlet pressure that was prevalent before the change of gear or an inlet pressure that makes possible a build up of torque towards the maximum torque that can be developed by the combustion engine with the desired rate of build up of torque when the propulsion chain is closed and driving force is again required.

During the regulation of the turbine 204, regulation of the exhaust gas brake system (the constriction arrangement) 215 may be required at the same time in order for the desired pressure condition to be achieved, such as the desired outlet pressure $P_{ut}$ or the required difference in pressure across the turbine such that it is possible to achieve the desired rate of revolution of the turbine, and thus the desired compression.

It will be realised that an increased inlet pressure $P_{in}$ with a maintained outlet pressure $P_{ut}$ will reduce the relative difference in pressure across the combustion engine, and thus also the braking force that acts on the combustion engine. This, in turn, means that the combustion engine will no longer be braked with the same preferably linear reduction in speed that was obtained up until the time $t_a$. Either consideration of this can be taken during the calculation of the time $t_2$ at which the synchronisation is completed, or the rate of revolution of the combustion engine can be monitored in order to determine whether synchronisation has been achieved.

According to one embodiment, the outlet pressure $P_{ut}$ may be allowed temporarily to exceed the reference pressure $P_{utlopp\_ref}$ with a corresponding increase in the inlet pressure in order in this way to maintain a constant differential pressure across the combustion engine 101 during the complete, or at least a major part of, the synchronisation process. Whether or not this is possible depends, however, on tolerances for the components; it may, for example, be permitted to exceed for a short period the limitation on pressure at the outlet, which limitation applies to a pressure that is to be applied for a long period. The build up of pressure that has been initiated according to step 307 may be arranged to continue until it is determined in step 308 that the rate of revolution $n_{motor}$ of the combustion engine has reached the synchronisation rate of revolution $n_2$. As long as this is not the case, the method may remain in step 308 while the inlet pressure is at the same time raised, whereby it may be determined in step 308 also whether the inlet pressure $P_{in}$ has reached the desired inlet pressure, in which case continued build up of pressure is no longer required, and whereby this can be taken into consideration during the regulation.

The method is subsequently terminated in step 309 when the synchronisation rate of revolution $n_2$ has been reached, whereby the propulsion chain can again be closed in a suitable conventional manner, which is not within the scope of the present invention.

Furthermore, the raising of the inlet pressure that is initiated in step 307 may be arranged such that it is maximised as far as is possible, i.e. the adjustable guide rails are regulated such that the greatest possible acceleration is obtained at the turbine in order to again raise the inlet pressure $P_{in}$ as rapidly as possible.

Furthermore, the invention has been described above in a manner in which the adjustable guide rails are controlled up until the time $t_a$ in such a manner that the turbine is supplied with essentially no force at all. There may, however, be advantages to maintaining the speed of rotation of the turbine at a suitable speed of rotation in order to ensure correct lubrication of bearings, the drive shaft, etc., as is known by one skilled in the arts, but where no compression, or essentially no compression, of the combustion air is achieved.

Furthermore, the present invention has been described above for examples associated with vehicles. The invention may, however, be applied at any freely chosen transport means or process in which a change of gear as described above is to be carried out, such as, for example, water-borne and airborne vessels with the change of gear process described above.

It should be noted also that the system can be modified according to various embodiments of the method according to the invention (and vice versa) and that the present invention is not in any way limited to the embodiments of the method according to the invention described above: it concerns and comprises all embodiments within the protective scope of the attached independent patent claims.

The invention claimed is:

1. A method for propulsion of a vehicle, wherein the vehicle comprises:
  a combustion engine, a gearbox adjustable to a number of gear ratios for transfer of a force between the combustion engine and at least one driving wheel, wherein the combustion engine comprises at least one combustion chamber with at least one inlet for supply of combustion gas and at least one outlet for evacuation of an exhaust gas flow that has resulted from combustion in the combustion chamber, and a turbocharger unit for pressurisation of the combustion gas, the turbocharger unit comprising a turbine with adjustable guide rails and a compressor;
  the method comprising, during a change of gear from a first higher gear ratio to a second lower gear ratio, a rate of revolution of the combustion engine being reduced from a first rate of revolution to a second rate of revolution during the change of gear, the steps of:

controlling, by an electronic control unit, the turbine and the compressor by the adjustable guide rails such that inlet pressure of the combustion gas at the inlet to the combustion chamber is reduced;

increasing, by the electronic control unit, the outlet pressure of the exhaust gas at the outlet from the combustion chamber through at least a throttle valve in the outlet, which constricts the exhaust gas flow; and controlling, by the electronic control unit, the adjustable guide rails such that the turbine and the compressor are caused to rotate at a higher rate of revolution, which causes an increase of the inlet pressure at the inlet to the combustion chamber, when the rate of revolution of the combustion engine has at least partially fallen towards the second rate of revolution.

2. The method according to claim 1, further comprising controlling the adjustable guide rails, by the electronic control unit, to cause the inlet pressure to increase before the rate of revolution of the combustion engine has fallen to the second rate of revolution.

3. The method according to claim 2, further comprising starting, by the electronic control unit, the increase of the inlet pressure when the rate of revolution of the combustion engine has fallen to a rate of revolution that is constituted of the said second rate of revolution plus a selected value in the range of 10-50% of the difference in the rate of revolution between the first rate of revolution and the second rate of revolution.

4. The method according to claim 1, further comprising starting, by the electronic control unit, the increase of the inlet pressure when the rate of revolution of the combustion engine has fallen to the second rate of revolution but before the said combustion engine is reconnected with the driving wheels through the gearbox.

5. The method according to claim 1, further comprising, maintaining, by the electronic control unit, a constant difference in pressure between the inlet pressure and the outlet pressure during the reduction of the rate of revolution for the combustion engine.

6. The method according to claim 1, wherein the throttle valve is arranged downstream of the outlet of the combustion chamber, whereby the outlet pressure is maintained at a constant value during the reduction in the rate of revolution, at least partially with the aid of the throttle valve, and at least until the inlet pressure has started to increase.

7. The method according to claim 1, wherein the outlet pressure is constituted by a pressure of at least double the pressure that surrounds the vehicle.

8. The method according to claim 1, wherein, when the inlet pressure is reduced, the electronic control unit controls the pressure at least towards a pressure lower than a pressure prevalent at the beginning of the pressure-reduction process.

9. The method according to claim 1, further comprising, during the increase of the inlet pressure, the electronic control unit increases the outlet pressure to a pressure higher than the pressure that was prevalent at the outlet before the increase of the inlet pressure to reduce the fall in differential pressure across the combustion engine during the increase of the inlet pressure.

10. The method according to claim 9, wherein the further increase of the outlet pressure follows the increase in the inlet pressure.

11. The method according to claim 10, wherein, during the further increase of the outlet pressure, the electronic control unit increases the outlet pressure to a level that exceeds a limitation on pressure with respect to non-instantaneous pressure that is prevalent at the outlet.

12. The method according to claim 1, further comprising, during the increase of the inlet pressure, controlling, by the electronic control unit, the adjustable guide rails to obtain a maximum rate of build up of the inlet pressure.

13. The method according to claim 1, further comprising performing the method when the combustion engine is disengaged from the at least one driving wheel.

14. The method according to claim 1, further comprising starting, by the electronic control unit, at least one of the constriction of the exhaust gas flow and the reduction of the inlet pressure at least before the combustion engine has been completely disengaged from the driving wheel.

15. The method according to claim 14, further comprising performing the constriction of the exhaust gas flow through control, by the electronic control unit, of a constriction device arranged downstream of the turbocharger unit.

16. The method according to claim 1, further comprising performing the constriction of the exhaust gas flow through control, by the electronic control unit, of at least one of an exhaust gas brake system and a compression brake.

17. A computer program product comprising a non-transitory medium that can be read by a computer and a computer program comprising program code stored on the medium and the stored program can be read by a computer and when the program code is executed in a computer, the computer carries out the method according to claim 1.

18. A system for propulsion of a vehicle, wherein the vehicle comprises:

a combustion engine, a gearbox adjustable to a plurality of gear ratios for transfer of a force between the combustion engine and at least one driving wheel, wherein the combustion engine comprises at least one combustion chamber with at least one inlet for supply of combustion gas and at least one outlet for the evacuation of an exhaust gas flow that has resulted from combustion in the combustion chamber, and a turbocharger unit configured for pressurisation of the combustion gas, the turbocharger unit comprising a turbine with adjustable guide rails and a compressor;

the system comprising:

an electronic control unit which controls the turbine and the compressor by the adjustable guide rails such that the inlet pressure of the combustion gas at the inlet to the combustion chamber is reduced during a change of gear from a first higher gear to a second lower gear ratio, a rate of revolution of the combustion engine being reduced from a first rate of revolution to a second rate of revolution during the change of gear, and at least a throttle valve in the outlet, which increases the outlet pressure of the exhaust gas at the outlet from the combustion chamber by constriction of the exhaust gas flow during the change of gear, wherein, when the rate of revolution of the combustion engine has at least partially fallen towards the said second rate of revolution, during the change of gear, the electronic control unit controls the adjustable guide rails such that the turbine and the compressor are caused to rotate at a higher rate of revolution, which causes an increase of the inlet pressure at the inlet to the combustion chamber.

19. The system according to claim 18, wherein the combustion engine is configured for any one of the group of controlling of a vehicle engine, a marine engine, and an industrial engine.

20. The system according to claim 18, wherein the combustion engine is comprised of several of the combustion chambers.

21. The system according to claim 18, wherein the turbocharger unit is constituted with a variable geometry.

22. A vehicle comprising a system according to claim 18.

* * * * *